(12) United States Patent
Knight

(10) Patent No.: US 6,840,675 B2
(45) Date of Patent: Jan. 11, 2005

(54) RECLOSABLE PACKAGING HAVING ZIPPER WITH SCULPTED SLIDER END STOPS

(75) Inventor: Nigel D. Knight, Kankakee, IL (US)

(73) Assignee: Illinois Tool Works Inc., Glenview, IL (US)

(*) Notice: Subject to any disclaimer, the term of this patent is extended or adjusted under 35 U.S.C. 154(b) by 4 days.

(21) Appl. No.: 10/153,521

(22) Filed: May 22, 2002

(65) Prior Publication Data

US 2003/0219175 A1 Nov. 27, 2003

(51) Int. Cl.⁷ .............................................. B65D 33/16
(52) U.S. Cl. .................................... 383/64; 24/399
(58) Field of Search .......................... 383/64; 24/399, 24/400

(56) References Cited

U.S. PATENT DOCUMENTS

| | | | |
|---|---|---|---|
| 5,088,971 A | | 2/1992 | Herrington |
| 5,131,121 A | * | 7/1992 | Herrington et al. ............ 24/436 |
| 5,189,764 A | * | 3/1993 | Herrington et al. ............ 24/384 |
| 5,836,056 A | | 11/1998 | Porchia et al. |
| 5,950,285 A | | 9/1999 | Porchia et al. |
| 5,991,980 A | * | 11/1999 | Meager ........................ 24/400 |
| 6,036,796 A | | 3/2000 | Halbert et al. |
| 6,047,450 A | * | 4/2000 | Machacek et al. ............ 24/399 |
| 6,186,663 B1 | | 2/2001 | Ausnit |
| 6,287,001 B1 | | 9/2001 | Buchman |
| 6,357,914 B1 | | 3/2002 | Kinigakis et al. |
| 6,508,969 B1 | * | 1/2003 | Kolovich et al. ........... 264/252 |
| 6,569,368 B2 | * | 5/2003 | Machacek ................... 264/155 |
| 6,612,002 B1 | * | 9/2003 | Savicki ....................... 24/585.1 |
| 2001/0026649 A1 | | 10/2001 | Catchman |

FOREIGN PATENT DOCUMENTS

| | | |
|---|---|---|
| WO | WO 00/76346 | 12/2000 |
| WO | WO 02/19860 | 3/2002 |

* cited by examiner

*Primary Examiner*—Jes F. Pascua
(74) *Attorney, Agent, or Firm*—Ostrager Chong Flaherty & Broitman P.C.

(57) ABSTRACT

Flexible zippers having sculpted slider end stops and reclosable packages incorporating such slider-operated zippers. In one embodiment, the flexible zipper comprises a joined end and a slider end stop that projects laterally beyond a side surface of the major portion of the zipper. The slider end stop is integrally formed with an adjoining portion of the joined end. In another embodiment, the flexible zipper comprises a joined end and a slider end stop that projects upward to an elevation higher than an elevation of a top surface of the major portion of the zipper and is laterally offset relative to a vertical midplane of the zipper. This slider end stop is also integrally formed with an adjoining portion of the joined end. These structures can be combined to form an end stop that projects upward and laterally outward. Each end stop is asymmetric relative to a vertical midplane of the zipper.

38 Claims, 6 Drawing Sheets

RECLOSABLE PACKAGING HAVING ZIPPER WITH SCULPTED SLIDER END STOPS

BACKGROUND OF THE INVENTION

This invention generally relates to slider-operated flexible zippers for use in reclosable pouches, bags or other packages of the type in which perishable material, such as foodstuff, may be stored.

Reclosable fastener assemblies are useful for sealing thermoplastic pouches or bags. Such fastener assemblies often include a plastic zipper and a slider. Typically, the plastic zippers include a pair of interlockable fastener elements, or profiles, that form a closure. As the slider moves across the profiles, the profiles are opened or closed. The profiles in plastic zippers can take on various configurations, e.g. interlocking rib and groove elements having so-called male and female profiles, interlocking alternating hook-shaped closure elements, etc.

Conventional slider-operated zipper assemblies typically comprise a plastic zipper having two interlocking profiles and a slider for opening and closing the zipper. In one type of slider-operated zipper assembly, the slider straddles the zipper and has a separating finger at one end that is inserted between the profiles to force them apart as the slider is moved along the zipper in an opening direction. The other end of the slider is sufficiently narrow to force the profiles into engagement and close the zipper when the slider is moved along the zipper in a closing direction.

Other types of slider-operated zipper assemblies avoid the use of a separating finger. For example, U.S. Pat. No. 6,047,450 discloses a zipper comprising a pair of mutually interlockable profiled structures. The first profiled structure comprises an interlocking element on a surface directed toward the second profiled structure and an integral base directed away from the second profiled structure. Likewise, the second profiled structure comprises an interlocking element on a surface directed toward the first profiled structure and an integral base directed away from the first profiled structure. Additionally, portions of the two profiled structures form a fulcrum about which the profiled structures may be pivoted out of engagement when lower edges of the bases are forced towards each other.

One of the important features of such reclosable fastener assemblies are the end stops, which prevent the slider from falling off the end of the fastener when the slider reaches the end of the fastener. End stops have taken on various configurations, such as, for example, riveted end clamps such as those described in U.S. Pat. Nos. 5,067,208 and 5,161,286; transverse end stops made from molten material of the fastener strips, as described in U.S. Pat. No. 5,088,971; reciprocating anvils, as described in U.S. Pat. No. 5,131,121; tubular end stops, as described in U.S. Pat. No. 5,405,478; a window structure combined with sealed zipper ends, as described in U.S. Pat. No. 5,442,837; or plastic end clips fused to the zipper as described in U.S. Pat. No. 5,448,807.

U.S. Pat. No. 5,950,285 discloses a reclosable bag having end stops that prevent a slider from moving beyond the end of the zipper when the slider reaches either the closed or fully open position. The end stops are formed from the material of the zipper profiles and "rise vertically" from the zipper to block and prevent further longitudinal movement of the slider. The end stops are formed by first aligning together the opposing profiles at an end stop area proximate to an end of the bag, and then fusing the zipper profiles at the end stop area to provide a vertical structure for preventing movement of the slider past the ends of the zipper, while at the same time keeping the so-called "rails," i.e., the corners of the zipper profile that retain the slider, intact. Preferably, the profiles are fused by directing ultrasonic energy to the end stop area. Optionally, the end stops have ridges disposed along their surfaces.

In some prior art slider-operated zippers, a vertical end may tend to fold when a slider is pressed against the end stop. If the end stop folds, the slider may not be stopped, thereby rendering the end stop ineffective. There is a need for slider end stop designs that resist bending or folding when a slider is pressed against the end stop.

BRIEF DESCRIPTION OF THE INVENTION

The invention is directed to flexible zippers comprising sculpted slider end stops. The invention is also directed to reclosable packages comprising such flexible zippers having sculpted slider end stops.

One aspect of the invention is a flexible zipper comprising a joined end and a slider end stop that projects laterally beyond a side surface of the major portion of the zipper. The slider end stop is integrally formed with an adjoining portion of the joined end.

Another aspect of the invention is a flexible zipper comprising a joined end and a slider end stop that projects upward to an elevation higher than an elevation of a top surface of the major portion of the zipper and is laterally offset relative to a vertical midplane of the zipper. This slider end stop is also integrally formed with an adjoining portion of the joined end.

Yet another aspect of the invention is a flexible zipper comprising a joined end and a slider end stop that projects upward to an elevation higher than an elevation of a top surface of the major portion of the zipper and projects laterally beyond a side surface of that major portion. Again the slider end stop is integrally formed with an adjoining portion of the joined end.

A further aspect of the invention is a reclosable package comprising a receptacle, a flexible zipper joined to the receptacle and a slider mounted to the zipper, wherein the zipper comprises first and second zipper parts joined along a first section of the zipper and interlockable along a second section of the zipper, the first section of the zipper comprising a slider end stop that is arranged asymmetrically relative to a vertical midplane of the second section of the zipper.

In accordance with further aspects of the invention, for each zipper described above, a slider is mounted to the zipper and the resulting slider/zipper assembly is installed in a package. The zippers may be of the type having both ends joined or the type having only one end joined, e.g., a side gusset pouch with a pouring spout.

Other aspects of the invention are disclosed and claimed below.

DETAILED DESCRIPTION OF THE INVENTION

Figure 1:
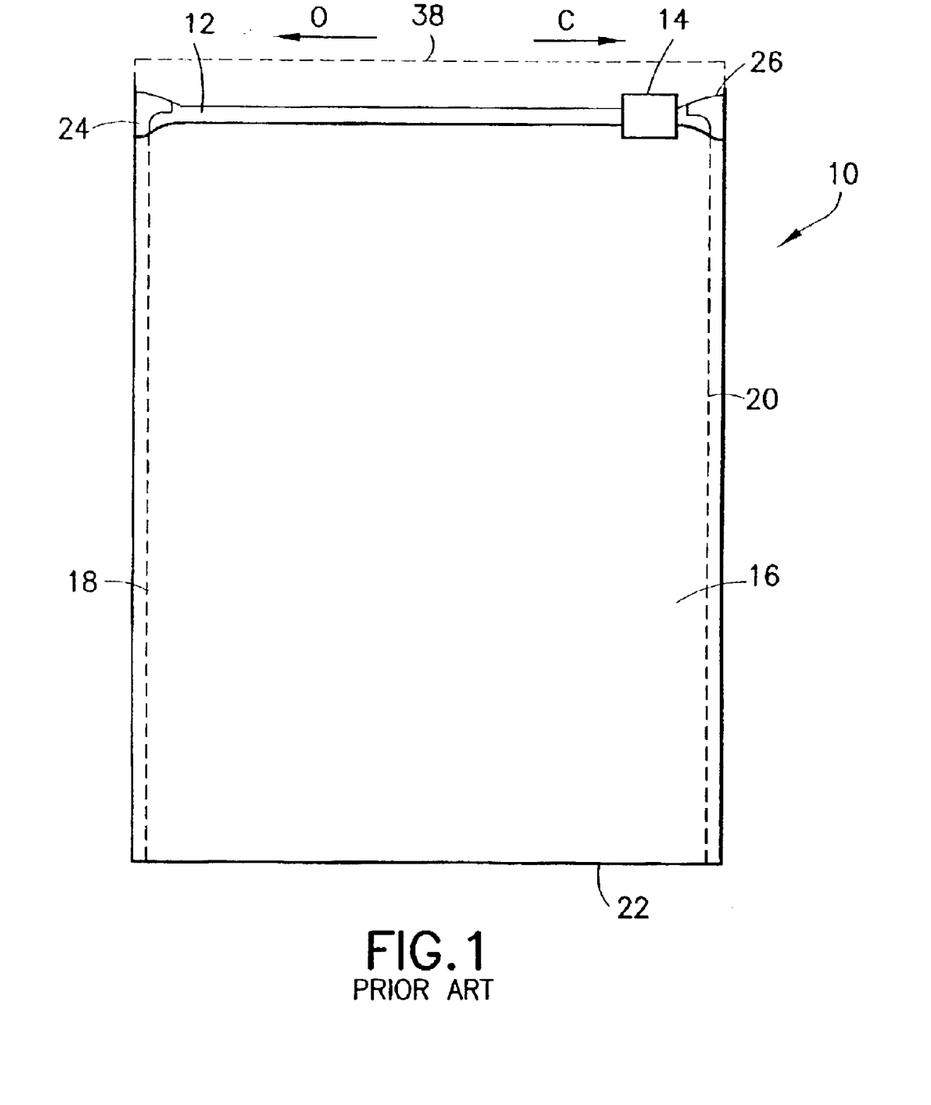
FIG. 1 is a schematic showing a reclosable package having a slider-operated zipper with sculpted end stops.

Reference will now be made to the drawings, in which similar elements in different drawings bear the same reference numerals. A reclosable package or bag 10, having a flexible plastic zipper 12 operated by manipulation of a slider 14 and having sculpted slider end stops 24 and 26, is shown in FIG. 1. The bag 10 may be made from any suitable sheet material or plastic film and comprises opposing wall panels (only the front panel 16 is visible in FIG. 1), which may be secured together at opposite side edges of the bag by seams 18 and 20 (indicated by dashed lines). The opposing bottoms of the wall panels may be joined, for example, by means of a heat seal made in conventional fashion, e.g., by application of heat and pressure or ultrasonic energy. Typically, however, the bottom of the package is formed by a fold 22 in the original packaging film, as seen in FIG. 1.

Figure 3:
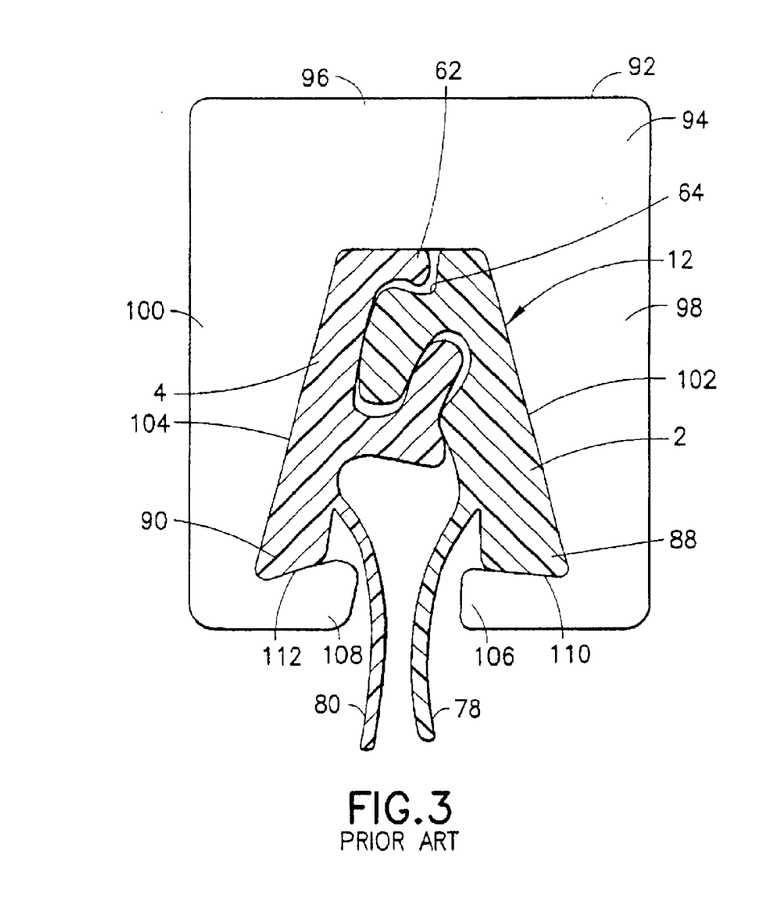
FIG. 3 is the same view as presented in FIG. 2, except that a slider has been mounted to the interlocked zipper.

At its top end, the bag 10 has an openable mouth, on the inside of which is an extruded plastic zipper 12. The zipper 12 comprises a pair of interlockable fastener strips or zipper halves 2 and 4 (best seen in FIG. 3). Although FIG. 3 shows a rib and groove arrangement, the profiles of the zipper halves may take any form. For example, the zipper may comprise interlocking rib and groove elements or alternating hook-shaped closure elements. The preferred zipper material is polyethylene.

The front and rear bag wall panels are respectively sealed to the zipper halves by heat fusion or welding in conventional manner. Alternatively, the interlockable zipper halves can be attached to the wall panels by adhesive or bonding strips or the zipper profiles can be extruded integrally with the bag material. For the purpose of joinder, the zipper halves may be provided with respective extension flanges 78, 80, to which an upper portion of the respective bag wall panel is fused or welded. The walls of the bag may be formed of various types of thermoplastic material, such as low-density polyethylene, substantially linear copolymers of ethylene and a C3–C8 alpha-olefin, polypropylene, polyvinylidene chloride, mixtures of two or more of these polymers, or mixtures of one of these polymers with another thermoplastic polymer. The person skilled in the art will recognize that this list of suitable materials is not exhaustive. The bag material may be either transparent or opaque.

Optionally, the bag 10 may be provided with an enclosed header 38, indicated by dashed lines in FIG. 1, which encompasses the zipper and the slider prior to the package being opened. Alternatively, the header may be provided with openings on both front and rear panels at the closed position of the slider, with the openings being sized and shaped to allow the slider to protrude through the openings on both sides of the header. The header 38 may be a panel or strip formed from the same material as that comprising the walls of the package or from the same material as that comprising the zipper or from an entirely separate material. More specifically, the header may comprise a panel of thermoplastic material that is heat sealed or ultrasonically welded to either the zipper flanges or the package walls. Alternatively, the header may be formed as an extension of the zipper flanges or the package walls.

In zippered bags with sliders, as the slider moves across the zipper, the zipper is opened or closed. As shown in FIG. 1, the slider is slidable along the zipper in a closing direction "C", causing the zipper halves to become engaged, or in an opening direction "O", causing the zipper halves to become disengaged.

The slider for opening or closing the reclosable zipper is generally shaped so that the slider straddles the zipper profiles. The slider may be made in multiple parts and welded together or the parts may be constructed to be snapped together. The slider may also be of one-piece construction. The slider can be made using any desired method, such as injection molding. The slider can be molded from any suitable plastic, such as nylon, polypropylene, polystyrene, acetal, polyketone, polybutylene terephthalate, high-density polyethylene, polycarbonate, or ABS.

Figure 2:
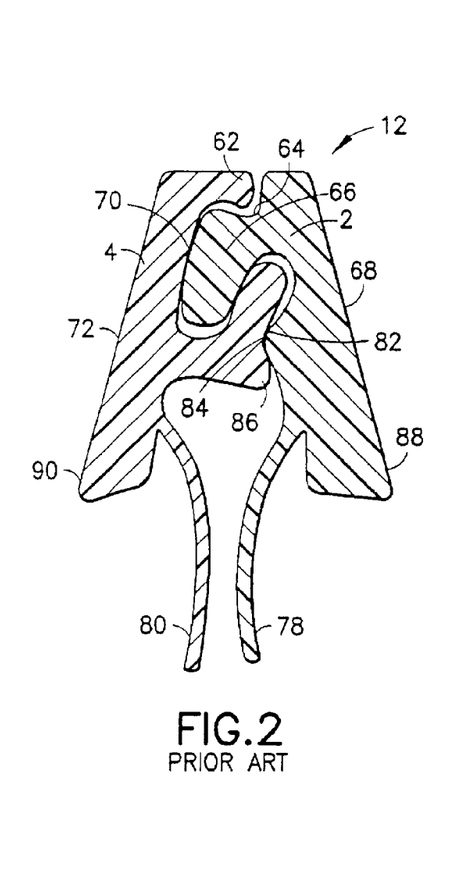
FIG. 2 is a cross-sectional view of an interlocked zipper of a known slider-operated plastic zipper having no separating finger.

FIG. 2 shows a cross-sectional view of a known plastic zipper 12 designed for operation by a slider. The zipper 12 is preferably formed of a resilient plastic material, such as polyethylene, and comprises a first profiled zipper part 2 and a second profiled zipper part 4. The zipper 12 is disposable inside and across the mouth of the package, as shown in FIG. 1.

The first profiled structure 2 comprises a male member 66 designed to interlock with the second profiled structure 4 and a relatively stiff base 68. Similarly, the second profiled structure 4 comprises a female member 70, designed to interlock with the male member 66 of the first profiled structure 2, and a relatively stiff base 72.

As is clear from FIG. 1, the outer surface of the bases 68 and 72 are not parallel, but diverge downwardly to form a shape that resembles a letter "A" that is truncated at the top. Because of this "A" configuration, the zipper is difficult to open from the contents (i.e., product) side of the receptacle, since the opening force tends to push the lower extremities of the profiled structures apart, thereby enhancing the interlock between the male member 66 and the female member 70. The zipper 12 is sealable to the receptacle of the package at base extensions or flanges 78 and 80.

The male profiled structure 2 also includes a convex fulcrum member 82 that engages a concave fulcrum member 84 of the female profiled structure 4 to form a fulcrum 86, as shown in FIG. 1. The fulcrum 86 is not equidistant between the bases 68 and 72, but rather is offset closer to the profiled structure 2. The surfaces of the fulcrum members 82 and 84 are contoured to form a seal between the interlocked profiled structures 2 and 4 at the fulcrum 86.

When the rails 88 and 90 are forced towards each other, the resulting leverage causes the profiled structures 2 and 4 to pivot oppositely about the fulcrum 86 and disengage from each other. The male member 66 is shaped to easily disengage from the female member 70 by this pivoting action. A top latch 62 on the female member 70 is resiliently releasable from the top cavity or indent 64 in the male member 66 to permit opening upon a force being applied to the latch 62 by an upper shoulder (not shown) on an associated slider. To ensure proper pivoting of the profiled structures 2 and 4, the bases 68 and 72 should be more rigid than the male and female members 66 and 70. This may be achieved, for example, by making the bases 68 and 72 thicker than the resilient portions of members 66 and 70.

To facilitate opening and closing of the zipper 12, the zipper 12 is provided with a straddling slider 92, as shown in FIG. 3. The slider 92 can be top-loaded onto the zipper without having to disengage the profiled structures at the loading point since the slider does not make use of a separating finger. The slider is slidable along the zipper in a closing direction, indicated by the arrow labeled "C" in FIG. 1. The profiled structures 2 and 4 are engaged, i.e., interlocked, with each other as the slider travels in the closing direction. Similarly, the slider is slidable along the zipper in an opening direction, indicated by the arrow labeled "O" in FIG. 1. The profiled structures 2 and 4 are disengaged from each other as the slider travels in the opening direction. The slider 92 is preferably made of a resilient plastic material, such as delrin, polypropylene, PBT, etc.

FIG. 3 depicts a closing end 94 of the slider 92, with the zipper 12 shown in cross section. The closing end is shaped to force the profiled structures 2 and 4 into engagement when the slider 92 travels in the closing direction. During slider travel in the closing direction, the closing end is the trailing end of the slider. As shown in FIG. 3, the slider 92 straddles the zipper 12 and has a top 96 from which a first arm 98 and a second arm 100 depend. The first arm 98 has an inner surface 102 and the second arm 100 has an inner surface 104. The slider inner surfaces 102 and 104 are divergent with respect to each other in the same manner as the zipper bases 68 and 72, and are spaced to push the profiled structures 2 and 4 into engagement as the slider 92 is moved along the zipper 12 in the closing direction. The slider arms 98 and 100 are respectively provided with retaining shoulders 106 and 108 having upper surfaces 110 and 112 that mate with the lower surfaces of the rails 88 and 90. These mating surfaces may be tapered to maximize their pull-off resistance.

Opening of the zipper 12 is achieved when the slider 92 is moved in the opening direction. Although not shown, at the opening end of the slider, the slider arms have inner surfaces that are substantially parallel, rather than divergent as at the closing end 94 (shown in FIG. 3). As the slider is moved in the opening direction and the slider arm inner surfaces change from the "A" configuration of surfaces 102 and 104 (see FIG. 3) to the substantially parallel configuration of surfaces (not shown) at the opening end of the slider, the rails 88 and 90 of the profile bases 68 and 72 are forced towards each other, thereby forcing the fulcrum members into a tighter relationship and causing the profiled structures 2 and 4 to pivot oppositely about the fulcrum 86. Simultaneously, a retaining shoulder (not shown) on the first slider arm forces the male profile upwardly, while a shoulder forces the female profile downwardly, causing the convex male fulcrum member 82 (see FIG. 2) to cam upwardly along the concave female fulcrum member 84. Thus, the resulting action is a simultaneous pivoting of the profiled structures 2 and 4 oppositely about the fulcrum 86 and an upward translation of the first profiled structure 2 relative to the second profiled structure 4, resulting in disengagement of the profiled structures. A cavity (not shown) in the slider top accommodates the upward translation of the male profiled structure 2.

The bag shown in FIG. 1 further comprises end stops 24 and 26 for preventing the slider from sliding off the end of the zipper when the slider reaches the closed or fully opened position. Such end stops perform dual functions, serving as stops to prevent the slider from going off the end of the zipper and also holding the two zipper profiles together to prevent the bag from opening in response to stresses applied to the profiles through normal use of the bag. In accordance with one embodiment of the invention, the end sections of the zipper are stomped to form slider end stops at opposing ends thereof. In each end section, the zipper parts are joined by application of heat and pressure, e.g., by impingement of ultrasonic wave energy. During deformation, thermoplastic zipper material flows into a pocket formed in the anvil, which pocket of material will become a slider end stop after the thermoplastic material has cooled.

Figure 4:
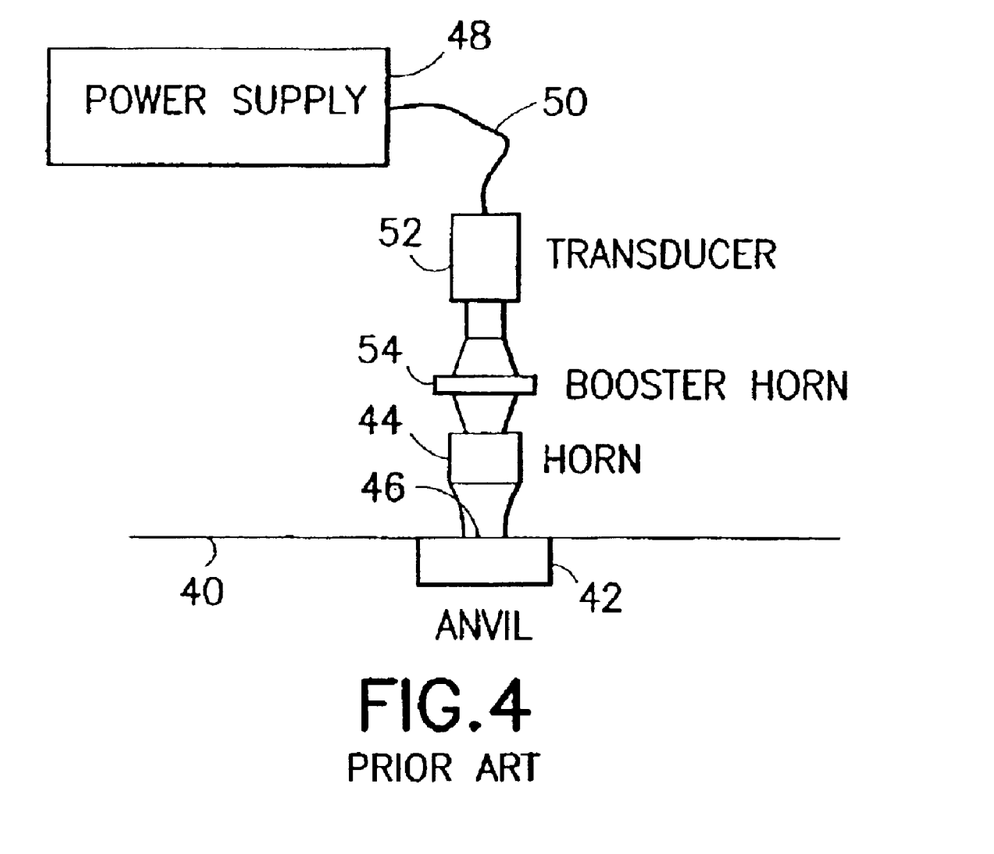
FIG. 4 is a schematic showing a typical ultrasonic welding apparatus for welding thermoplastic material.

Welding and sealing of thermoplastic material by ultrasonic vibrations is an established process and has been used for forming slider end stops on the ends of a slider-operated zipper in a reclosable package. FIG. 4 shows a typical ultrasonic welding apparatus in which a workpiece 40 is fed through an ultrasonic weld station comprising an anvil 42 and an oppositely disposed resonant horn 44. The frontal surface 46 of the horn 44 and the anvil 42 are urged toward mutual engagement by force means, not shown, for causing the horn to be in forced contact with the workpiece for coupling the ultrasonic vibrations into the material, thereby effecting ultrasonic welding. The horn 44 is energized from a power supply 48 that provides electrical high-frequency power at a predetermined ultrasonic frequency via a cable 50 to an electroacoustic transducer 52, which, in turn, provides mechanical vibrations at that frequency to a booster or coupling horn 54 for coupling these vibrations to the horn 44. The horns 44 and 54 and the transducer 52 are dimensioned to be mechanically resonant longitudinally at the predetermined frequency. This combination of components forming an ultrasonic welding apparatus is well known to those skilled in the art.

Various embodiments of the invention will now be described with reference to FIGS. 5–10. Each embodiment comprises a slider end stop geometry that can replace the slider end stops depicted in FIG. 1, which are intended to be flattened regions with upwelled fused thermoplastic material symmetrically placed relative to a midplane of a zipper of the type shown in FIG. 2. However, the embodiments of the invention are not limited in application to zippers of the type shown in FIG. 2 or to reclosable packages of the type depicted in FIG. 1. The preferred method for forming slider end stops in accordance with the embodiments of the invention is ultrasonic welding using equipment of the type shown in FIG. 4. Such equipment for use in making the embodiments of the invention comprises a horn/anvil arrangement wherein the horn has a projection for forming a recess in an end section of the zipper and the anvil has a pocket shaped to form a projection on the end section, that projection being shaped to perform a slider end stop function when the sculpted thermoplastic material is cooled. During ultrasonic stomping, the thermoplastic zipper material in the end section is deformed by the projection on the horn and flows into the pocket of the anvil. As described in more detail below, relative to a midplane of the zipper section lying between the stomped end sections, the recess in the sculpted end section lies on one side of the midplane while the majority of the projection lies on the other side of the midplane, the result being a slider end stop that is asymmetrically formed relative to the midplane of the zipper.

Figure 5:
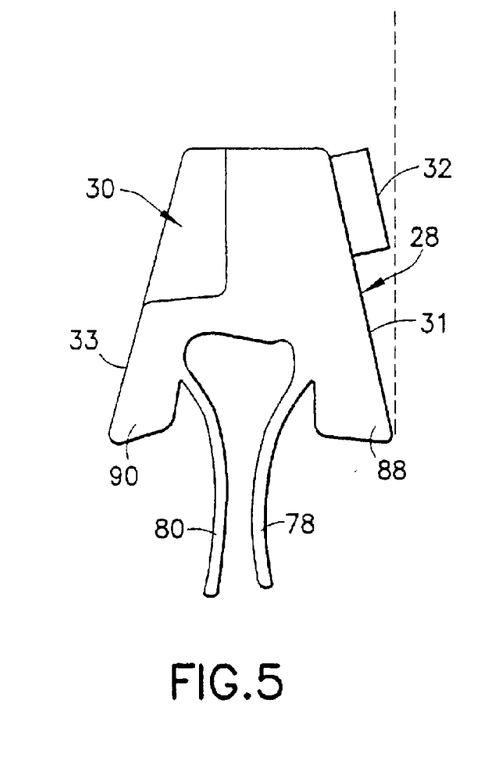
FIGS. 5 and 6 are schematics showing elevational and isometric views of a slider-operated zipper in accordance with a first embodiment of the invention.
Figure 6:
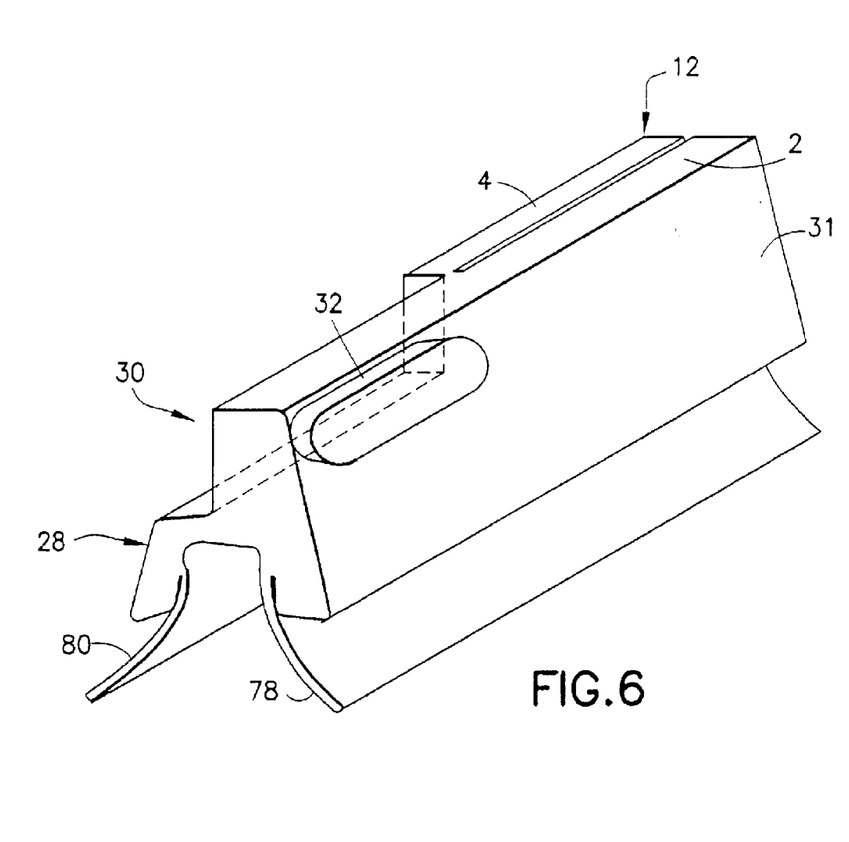

A first embodiment of the invention is depicted in FIGS. 5 and 6. The interlocked zipper parts of zipper 12 are stomped along an end section by application of ultrasound wave energy. Preferably, an ultrasonic horn and anvil are used to sculpt the end section to form the geometric end shape shown in FIGS. 5 and 6, the horn having a projection for forming a recess on one side of the zipper and the anvil having a pocket for forming a projection on the other side of the zipper. It should be appreciated that prior to stomping, the zipper parts in the end section are interlocked but not joined. After stomping, the zipper parts in the end section are ultrasonically welded together. Thus, the respective zipper parts 2 and 4 cannot be distinguished when the zipper is viewed from the end, as seen in FIG. 5. The welded end section is designated 28 in FIGS. 5 and 6. In addition, the thermoplastic zipper material in the welded end section is sculpted to have a recess 30 on one side of a midplane of the zipper and a projection or nub 32 on the other side of the zipper midplane. The nub 32 serves as a slider end stop for blocking further movement in one direction when the slider abuts the confronting end of the end stop. The nub 32 projects laterally beyond a side surface 31 of the unstomped portion of the zipper and is integrally formed with an adjoining portion of the welded end section of the zipper. For packages in which both ends of the zipper are welded, the other welded end of the zipper will have a similar construction.

The zipper shown in FIGS. 5 and 6 has respective side surfaces 31 and 33 that diverge in a direction from the top of the zipper to the rails 88 and 90. The recess 30 and the slider end stop 32 are formed in such a way that the rails 88 and 90 are substantially intact in the welded end section. More specifically, the activated horn, when moved toward the anvil with the zipper end section sandwiched therebetween, causes thermoplastic zipper material to soften and displace out of the space where the recess 30 is formed and into the space where the slider end stop 32 is formed. The slider end stop 32 does not project laterally beyond an edge of the rail (i.e., 88) on the same side of the zipper, the vertical projection of the edge being indicated in FIG. 5 by a dashed line. The recess 30 is formed in the upper portion of the welded end section and does not extend to the rail 90. The end stop 32 and the undeformed rails 88 and 90 in the welded end section cooperate to hold the slider, preventing the slider from being unintentionally derailed.

As seen in FIGS. 5 and 6, the welded end section 28 of the zipper has a profile that is substantially similar to the A-shaped profile of the undeformed zipper section, except that the profile of the latter does not have either a slider end stop or a recess. The recess 30 of the first embodiment may be formed by an ultrasonic horn having a projection having three generally mutually orthogonal flat surfaces, so that the recess 30 is bounded by three generally mutually orthogonal flat surfaces, as best seen in FIG. 6. The slider end stop 32 shown in FIG. 6 is generally oval in shape and elongated to extend longitudinally in the upper region of the welded end section of the zipper. However, it is not necessary to practice of the invention that the end stop be either elongated or oval. Although not shown in FIGS. 5 and 6, it should be appreciated that a slider is mounted to the zipper. The slider is movable along the zipper until blocked by the end stop 32.

Figure 7:
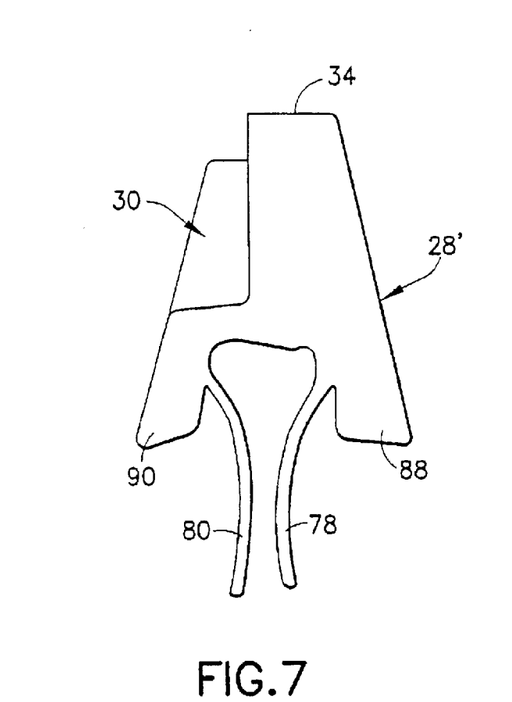
FIGS. 7 and 8 are schematics showing elevational and isometric views of a slider-operated zipper in accordance with a second embodiment of the invention.
Figure 8:
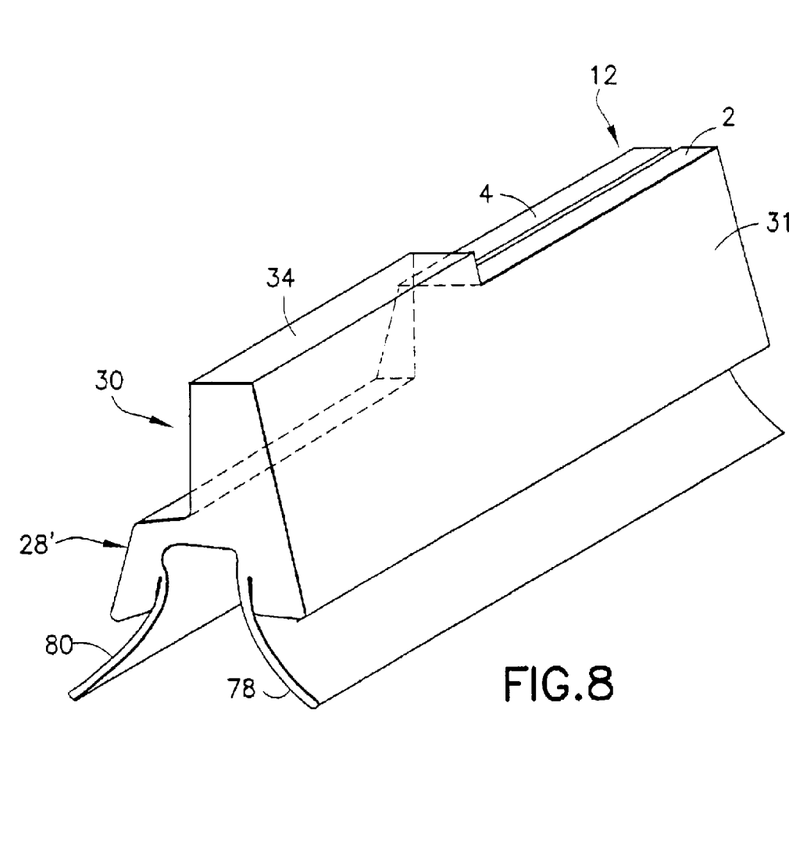

A second embodiment of the invention is depicted in FIGS. 7 and 8. Again, the interlocked zipper parts of the zipper are stomped along an end section by application of ultrasound wave energy. As in the first embodiment, the second embodiment comprises a recess 30 formed on one side of the zipper midplane. However, instead of the end stop being formed by a projection or nub on the side surface on the other side of the zipper midplane, the slider end stop 34 projects upward. This is accomplished by providing an anvil that has an inclined flat surface that contacts the side surface of the A-shaped zipper and directs flowing thermoplastic zipper material along that inclined flat surface. The slider end stop 34 projects to an elevation higher than an elevation of a top surface of the intermediate interlockable section of the zipper, is laterally offset relative to a vertical midplane of the intermediate section of the zipper (in other words, a major portion of the slider end stop lies on one side of the zipper midplane) and is integrally formed with an adjoining portion of welded end section 28' of the zipper. The recess 30 and the slider end stop 34 are formed in such a way that the rails 88 and 90 are substantially intact in the welded end section 28'. More specifically, the activated horn, when moved toward the anvil with the zipper end section sandwiched therebetween, causes thermoplastic zipper material to soften and displace out of the space where the recess 30 is formed and into the space where the slider end stop 34 is formed.

As seen in FIGS. 7 and 8, the welded end section 28' of the zipper has a profile that is substantially similar to the A-shaped profile of the undeformed zipper section, except that the profile of the latter does not have either a slider end stop or a recess. The slider end stop 34 shown in FIG. 8 is generally rectangular in shape and extend longitudinally along the top of the welded end section 28' of the zipper. However, it is not necessary to practice of the invention that the end stop be rectangular. The key is to sculpt the end section so that a mass of fused thermoplastic zipper material blocks further movement of the slider. The precise shape of that fused mass of thermoplastic material is not crucial to practice of the invention.

Figure 9:
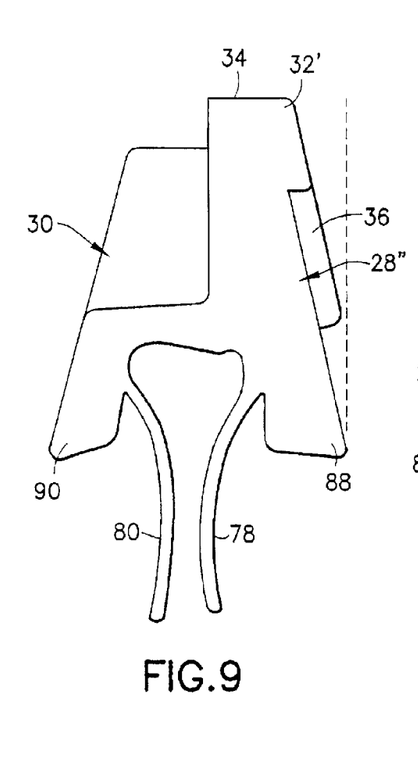
FIGS. 9 and 10 are schematics showing elevational and isometric views of a slider-operated zipper in accordance with a third embodiment of the invention.
Figure 10:
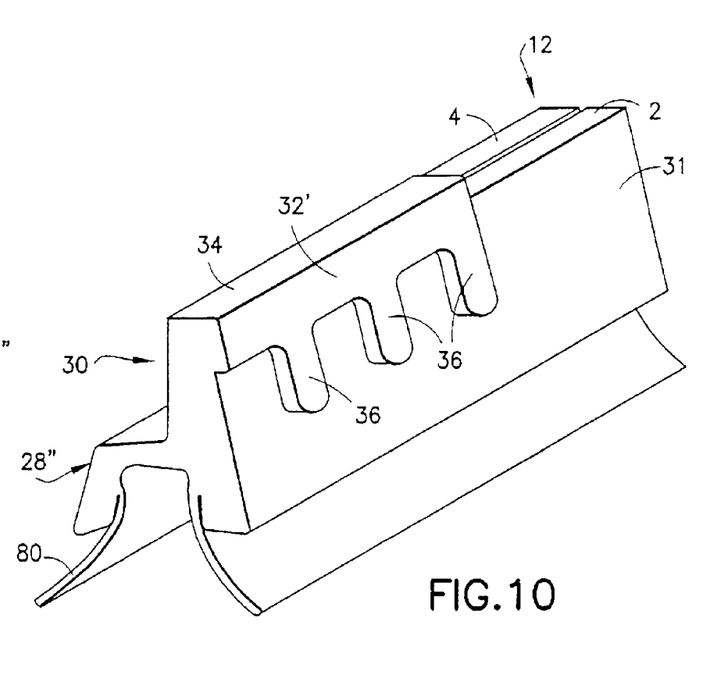

A third embodiment of the invention is depicted in FIGS. 9 and 10. Again, the interlocked zipper parts of the zipper are stomped along an end section by application of ultrasound wave energy. As in the earlier disclosed embodiments, the third embodiment comprises a recess 30 formed on one side of the vertical midplane of the zipper. However, in this third embodiment, the slider end stop projects both upward and laterally outward. In particular, the slider end stop comprises a portion 34 that projects upward to an elevation higher than an elevation of a top surface of the interlockable intermediate section of the zipper and a portion 32' that projects laterally beyond a side surface 31 of the intermediate section of the zipper. It will be appreciated by a person skilled in the art that these portions 32' and 34 are integrally formed with each other (and with adjoining portions of the welded end section) and that, in fact, a portion of the upwelled thermoplastic material that projects both outward and laterally outward is common to both projections. Thus these projections 32' and 34 in fact form a single unitary projection.

In addition, the welded end section 28" comprises a plurality of elongated ribs 36 that project laterally beyond the side surface 31 of the intermediate section of the zipper and extending generally transverse to the elongated projection 32'. Each rib 36 is integrally formed with an adjoining portion of the welded end section of the zipper and has one end integrally formed with an adjoining portion of projection 32'. Preferably the ribs 36 extend about ½ to ¾ of the way down the side of the zipper. The ribs 36 serve to increase the stiffness of that portion of the welded end section that extends above the bottom the recess 30. In addition, the rib 36 that is closest to the slider can be located such that the side surface of the projecting rib is coplanar and continuous with the stopping surfaces at the ends of the projections 32' and 34, whereby the side of the first rib plays a role in and provides additional area for blocking the slider.

It should be noted that the scale of the drawings does not reflect the fact that the length of the welded end sections in FIGS. 5–10 is preferably about ½ inch, although the scope of the invention is not limited to any particular dimension.

Since the amount of thermoplastic material needed to form the slider end stop structure (32', 34, 36) in the embodiment shown in FIG. 10 is greater than that needed to form either end stop in the first and second embodiments, the volume of recess 30 in the third embodiment shown in FIGS. 9 and 10 will be proportionately greater than the volume of the recesses formed in the first and second embodiments. In other words, in accordance with the principle of the conservation of mass, the greater the amount of thermoplastic material needed to sculpt the slider end stop, the greater the size of the recess that will be formed, the amount of material displaced from the recess being generally equal to the amount of material needed to build the projecting end stop structures. However, in practice some material from the recess will be displaced downward into the space between the extension flanges rather than contributing to the mass of the ultrasonically sculpted slider end stop.

Reclosable packages having slider-operated zippers with the geometric configurations described above can be manufactured using different methods. In accordance with one method of manufacture, package film is paid off a roll. Downstream a pull roller is provided for driving the film through the machine. A folder plow positioned downstream of the film roll folds the package film about a bottom crease (22 in FIG. 1) to form opposing package walls. Zipper tape is paid off a spool and fed between the advancing package walls. Preferably sliders are mounted to the zipper tape before the latter is joined to the packaging film material. The zipper tape is passed around a guide roller and fed in the machine direction at a predetermined height from the bottom fold in the package film. At a first sealing station, the zipper tape is sealed to the package walls by a pair of horizontal sealing bars. After this sealing operation, the packaging film is advanced one package increment. The zipper tape is then stomped at a stomping station comprising the horn and anvil described herein, thereby forming slider end stops for two contiguous packages that have not yet been separated. After stomping, the packaging film is again advanced one package increment. Then at a second sealing station, the folded film and zipper tape are cross-sealed by a pair of vertical sealing bars to form discrete packages, the end stops sculpted in the previous step overlapping and extending beyond the cross seal on opposite sides. Then at a cutting station, the individual packages are severed from one another. The separated packages are then ready to be filled. Alternatively, the packages can be filled and top sealed before cutting.

Optionally, the method further comprises the step of pre-heating at least one of the zipper parts prior to ultrasonically deforming the zipper parts. Optionally, the method may further comprise the step of directing cooling fluid toward an extension flange of at least one of the zipper parts during the ultrasonic deformation.

In accordance with another embodiment, a module is attached to the side of a form/fill/seal (FFS) machine. The module applies a slider to the zipper and stomps the zipper, using a horn and anvil of the type disclosed herein. These steps can be performed concurrently or in alternating sequence. Then the prepared zipper/slider assembly is fed into the FFS machine. Depending on the type of FFS machine, the zipper/slider assembly is fed either longitudinal (in the machine direction) or transverse (in the cross direction) to the direction of film web advancement using a registered/guided method. Then the extension flanges of the zipper halves are welded to the webs after the slider insertion and zipper stomping procedures. The completed web is then cross-sealed and cut-off in conventional fashion to form a separate package.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "package" means a container, bag, pouch or other receptacle for objects, material or stuff. A container, bag, pouch or other receptacle is deemed to be a package even if not yet packed with objects, material or stuff. As used in the claims, the verb "joined" means fused, welded, bonded, sealed, adhered, etc., whether by application of heat and/or pressure, application of ultrasonic energy, application of a layer of adhesive material or bonding agent, interposition of an adhesive or bonding strip, co-extrusion (e.g., of zipper and bag), etc.

What is claimed is:

1. A flexible zipper comprising first and second zipper parts joined along a first section of said zipper and interlockable along a second section of said zipper, said first zipper part comprising a first profiled element extending along said second section and said second zipper part comprising a second profiled element extending along said second section, said first and second profiled elements being mutually interlockable, and said first section of said zipper comprising a first slider end stop that projects laterally beyond a side surface of said second section and is integrally formed with an adjoining portion of said first section of said zipper, wherein said first and second zipper parts along said second section of said zipper have respective side surfaces that diverge in a direction from a top of said zipper to a pair of rails of said zipper and wherein said first slider end stop does not project laterally beyond an edge of the rail on the same side of said zipper.

2. The zipper as recited in claim 1 wherein said first and second zipper parts are also joined along a third section of said zipper, said second section being between said first and third sections, said third section said zipper comprising a second slider end stop that projects laterally beyond a side surface of said second section and is integrally formed with an adjoining portion of said third section of said zipper.

3. A flexible zipper comprising first and second zipper parts joined along a first section of said zipper and interlockable along a second section of said zipper, said first zipper part comprising a first profiled element extending along said second section and said second zipper part comprising a second profiled element extending along said second section, said first and second profiled elements being a mutually interlockable, and said first section of said zipper comprising a first slider end stop that projects laterally beyond a side surface of said second section an is integrally formed with an adjoining portion of said first section of said zipper, wherein said first section of said zipper has a recess on a side opposite to the side on which said first slider end stop projects, said recess being formed in an upper portion of said first section and not reaching a rail of said zipper.

4. The zipper as recited in claim 3, wherein said first section of said zipper has a profile that is substantially similar to a profile of said second section of said zipper except that the profile of the latter does not have a slider end stop or a recess.

5. The zipper as recited in claim 4, wherein said profile of said second section is A-shaped.

6. An assembly comprising a flexible zipper as recited in claim 2 and a slider mounted to said zipper, wherein said slider is movable along said second section of said zipper until blocked by said first or second slider end stop.

7. A reclosable package comprising a receptacle, a flexible zipper joined to said receptacle and a slider mounted to said zipper, wherein said flexible zipper is as recited in claim 1 and said slider is movable along said second section of said zipper until blocked by said first or second slider end stop.

8. A flexible zipper comprising first and second zipper parts joined along a first section of said zipper and interlockable along a second section of said zipper, said first zipper part comprising a first profiled element extending along said second section and said second zipper part comprising a second profiled element extending along said second section, said first and second profiled elements being mutually interlockable, and said first section of said zipper comprising a first slider end stop that projects upward to an elevation higher than an elevation of a top surface of said second section of said zipper, is laterally offset relative to a vertical midplane of said second section of said zipper and is integrally formed with an adjoining portion of said first section of said zipper.

9. The zipper as recited in claim 8, wherein said first and second zipper parts are also joined along a third section of said zipper, said second section being between said first and third sections, said third section of said zipper comprising a second slider end stop that projects upward to an elevation higher than an elevation of a top surface of said second section of said zipper, is laterally offset relative to a vertical midplane of said second section of said zipper and is integrally formed with an adjoining portion of said third section of said zipper.

10. The zipper as recited in claim 8, wherein said first section of said zipper further comprises a recess extending from said elevation of said top surface of said second section to an intermediate elevation located above a rail of said first section of said zipper.

11. The zipper as recited in claim 10, wherein said first section of said zipper comprises a smooth surface, a first portion of said smooth surface partly defining said recess and a second portion of said smooth surface forming a sidewall of said first slider end stop.

12. The zipper as recited in claim 8, wherein said first and second zipper parts along said second section of said zipper have respective side surfaces that diverge in a direction from a top of said zipper to a pair of rails of said zipper.

13. The zipper as recited in claim 10, wherein said first section of said zipper has a profile that is substantially similar to a profile of said second section of said zipper except that the profile of the latter does not have a slider end stop or a recess.

14. The zipper as recited in claim 13, wherein said profile of said second section is A-shaped.

15. An assembly comprising a flexible zipper as recited in claim 8 and a slider mounted to said zipper, wherein said slider is movable along said second section of said zipper until blocked by said first or second slider end stop.

16. A reclosable package comprising a receptacle, a flexible zipper joined to said receptacle and a slider mounted to said zipper, wherein said flexible zipper is as recited in claim 8, and said slider is movable along said second section of said zipper until blocked by said first or second slider end stop.

17. A flexible zipper comprising first and second zipper parts joined along a first section of said zipper and interlockable along a second section of said zipper, said first zipper part comprising a first profiled element extending along said second section and said second zipper part comprising a second profiled element extending along said second section, said first and second profiled elements being mutually interlockable, and said first section of said zipper comprising a first slider end stop that is integrally formed with an adjoining portion of said first section of said zipper, said first slider end stop projecting upward to an elevation higher than an elevation of a top surface of said second section of said zipper and projecting laterally beyond a side surface of said second section of said zipper, wherein said first section of said zipper further comprises a recess extending from said elevation of said too surface of said second section to an intermediate elevation located above a rail of said first section of said zipper.

18. The zipper as recited in claim 17, wherein said first and second zipper parts are also joined along a third section of said zipper, said second section being between said first and third sections, said third section of said zipper comprising a second slider end stop that is integrally formed with an adjoining portion of said third section of said zipper, said second slider end stop projecting upward to an elevation higher than said elevation of said top surface of said second section of said zipper and projecting laterally beyond said side surface of said second section of said zipper.

19. The zipper as recited in claim 17, wherein said first section of said zipper comprises a smooth surface, a first portion of said smooth surface partly defining said recess and a second portion of said smooth surface forming a sidewall of said first slider end stop.

20. A flexible zipper comprising first and second zipper parts joined along a first section of said zipper and interlockable along a second section of said zipper, said first zipper part comprising a first profiled element extending along said second section and said second zipper part comprising a second profiled element extending along said second section, said first and second profiled elements being mutually interlockable, and said first section of said zipper comprising a first slider end stop that is integrally formed with an adjoining portion of said first section of said zipper, said first slider end stop protecting upward to an elevation higher than an elevation of a top surface of said second section of said zipper and projecting laterally beyond a side surface of said second section of said zipper wherein said first section of said zipper further comprises an elongated rib that is integrally formed with an adjoining portion of said first section of said zipper and has one end integrally formed with an adjoining portion of said first slider end stop, said rib projecting laterally beyond said side surface of said second section of said zipper and extending generally transverse to said first slider end stop.

21. A flexible zipper comprising first and second zipper parts joined along a first section of said zipper and interlockable along a second section of said zipper, said first zipper part comprising a first profiled element extending along said second section and said second zipper part comprising a second profiled element extending along said second section, said first and second profiled elements being mutually interlockable, and said first section of said zipper comprising a first slider end stop that is integrally formed with an adjoining portion of said first section of said zipper, said first slider end stop protecting upward to an elevation higher than an elevation of a top surface of said second section of said zipper and projecting laterally beyond a side surface of said second section of said zipper wherein said first slider end stop comprises a first portion that extends generally parallel to lengthwise axis of said zipper and a second portion that projects laterally beyond said side surface of said first section of said zipper and extends generally transverse to said first portion of said first slider end stop, said second portion having one end integrally formed with one end of said first portion of said first slider end stop.

22. The zipper as recited in claim 17, wherein said first and second zipper parts along said second section of said zipper have respective side surfaces that diverge in a direction from a top of said zipper to a pair of rails of said zipper.

23. The zipper as recited in claim 17, wherein said first section of said zipper has a profile that is substantially similar to a profile of said second section of said zipper except that the profile of the latter does not have a slider end stop or a recess.

24. The zipper as recited in claim 23, wherein said profile of said second section is A-shaped.

25. An assembly comprising a flexible zipper as recited in claim 17 and a slider mounted to said zipper, wherein said slider is movable along said second section of said zipper until blocked by said first or second slider end stop.

26. A reclosable package comprising a receptacle, a flexible zipper joined to said receptacle and a slider mounted to said zipper, wherein said flexible zipper is as recited in claim 17, and said slider is movable along said second section of said zipper until blocked by said first or second slider end stop.

27. A reclosable package comprising a receptacle, a flexible zipper joined to said receptacle and a slider mounted to said zipper, wherein said flexible zipper comprises first and second zipper parts joined along a first section of said zipper and interlockable along a second section of said zipper, said first section of said zipper comprising a first slider end stop that is arranged asymmetrically relative to a vertical midplane of said second section of said zipper.

28. The package as recited in claim 27, wherein said zipper in said second section has respective side surfaces that diverge in and direction from a top of said zipper to a pair of rails of said zipper.

29. The package as recited in claim 28, wherein said second section of said zipper has an A-shaped profile.

30. The package as recited in claim 27, wherein said first slider end stop projects laterally beyond a side surface of said second section and is integrally formed with an adjoining portion of said first section of said zipper.

31. The package as recited in claim 27, wherein said first slider end stop projects upward to an elevation higher than an elevation of a top surface of said second section of said zipper and is integrally formed with an adjoining portion of said first section of said zipper.

32. The package as recited in claim 27, wherein said first and second zipper parts are also joined along a third section of said zipper, said second section being between said first and third sections, said third section of said zipper comprising a second slider end stop that is arranged asymmetrically relative to said vertical midplane.

33. The package as recited in claim 27, wherein said first section comprises a recess on one side of said vertical midplane, and a major portion of said first slider end stop is situated on the other side of said vertical midplane.

34. The zipper as recited in claim 3 wherein said first and second zipper parts are also joined along a third section of said zipper, said second section being between said first and third sections, said third section of said zipper comprising a second slider end stop that projects laterally beyond a said surface of said second section and is integrally formed with an adjoining portion of said third section of said zipper.

35. An assembly comprising a flexible zipper as recited in claim 34 and a slider mounted to said zipper, wherein said slider is movable along said second section of said zipper until blocked by said first or second slider end stop.

36. A reclosable package comprising a receptacle, a flexible zipper joined to said receptacle and a slider mounted to said zipper, wherein said flexible zipper is as recited in claim 3 said slider is movable along said second section of said zipper until blocked by said first or second slider end stop.

37. A reclosable package comprising a receptacle, a flexible zipper joined to said receptacle and a slider mounted to said zipper, wherein said flexible zipper is as recited in claim 20, and said slide is movable along said second section of said zipper until blocked by said first or second slider end stop.

38. A reclosable package comprising a receptacle, a flexible zipper joined to said receptacle and a slider mounted to said zipper, wherein said flexible zipper is as recited in claim 21, and said slide is movable along said second section of said zipper until blocked by said first or second slider end stop.

* * * * *